Sept. 20, 1971 W. M. SARNS 3,605,314
AUTOMATIC FISHING DEVICE
Filed Oct. 29, 1969 2 Sheets-Sheet 1

INVENTOR.
William M. Sarns
BY
ATTORNEY

Sept. 20, 1971   W. M. SARNS   3,605,314
AUTOMATIC FISHING DEVICE

Filed Oct. 29, 1969   2 Sheets-Sheet 2

INVENTOR.
William M. Sarns
BY
*ATTORNEY*

United States Patent Office 3,605,314
Patented Sept. 20, 1971

3,605,314
AUTOMATIC FISHING DEVICE
William M. Sarns, Rte. 2, Morley, Mich. 49336
Filed Oct. 29, 1969, Ser. No. 872,071
Int. Cl. A01k *97/00*
U.S. Cl. 43—15                      3 Claims

ABSTRACT OF THE DISCLOSURE

An automatic fishing device in which a pole is operatively connected to the trigger of an automatic reel in a relationship such that downward deflection of the pole in response to the action of a fish will release the reel to the action of its spring mechanism, causing tension to be applied to the fish line.

BACKGROUND OF THE INVENTION

Ice fishermen are well aware of the problems of properly setting the hook when the bitting action of the fish is as gentle as it is in winter. It is common practice for a fisherman to "work" two or three holes in the ice at once through the use of the well-known tip-up signal. This arrangement merely utilizes the forces applied by the fish to actuate a flag, leaving it to the fisherman to get there in time to handle the line properly. This time lapse is often critical, as the hook is not properly set until the fisherman arrives to control it.

Attempts have been made to produce an automatic device that will utilize a self-contained spring mechanism to set the hook and haul in the fish, once the fish has tugged on the line. An example of such an arrangement is shown in the Torbett patent (United States) 2,931,121. In general, these devices have proven to be somewhat over-complicated, and vulnerable to accumulations of ice and snow. The ice-fishing environment seems to be the "acid test" of such automatic fishing devices, as anything that will operate effectively under these conditions will work very well during the summer, operating over the side of a boat.

SUMMARY OF THE INVENTION

A so-called "automatic reel" of the type commonly used on fly-rods is incorporated into this invention without modification, except for the attachment of components to it. This type of fly-rod reel has a self-contained spring tending to wind up the fish line. The reel is controlled by a trigger associated with a latch mechanism such that the un-actuated position of the tugger corresponds with a rotatively fixed condition of the reel. Actuation of the trigger removes the restraint on the reel, and leaves it to the operation of the spring mechanism. In the usual application of the reel, this spring action is merely used to wind up the slack between the reel and the point on the fish line controlled by the fisherman's hand.

The present invention mounts this automatic reel on a bracket that can be secured conveniently to a seat of a fish shanty, or to the side of a boat. A short pole section is operatively connected directly to the trigger, such that downward movement of the pole with respect to the reel will release the trigger, and permit the reel to apply tension to the line. The normal installation of the automatic reel on the fly rod is underneath the fly rod, such that a finger of the hand holding the pole can pull the trigger upwardly to actuate it. In the preferred form of the present invention, the reel is mounted on top of the bracket to permit downward deflection of the pole to induce the actuation. A reversal of this arrangement would again permit the reel to be mounted on the underside, with a conversion mechanism such that downward deflection of the pole section would induce upward movement of the trigger. Preferably, the device is equipped with a supplemental tension device which is adjustable to increase or decrease the force required on the fish line to actuate the trigger. In the simplest form of the invention, the pole section is provided with a socket that slips directly over the trigger. The supplemental tension device is then conveniently in the form of a spring-biased plunger bearing on the underneath of the trigger-pole assembly to increase the downward resistance to movement that would otherwise be applied merely by the trigger spring.

DESCRIPTION OF THE DRAWINGS

The several features of the invention will be discussed in detail through reference to the preferred embodiment illustrated in the drawings, in which.

DESCRIPTION OF THE PREFERRED EMBODIMENT

Figure 1:
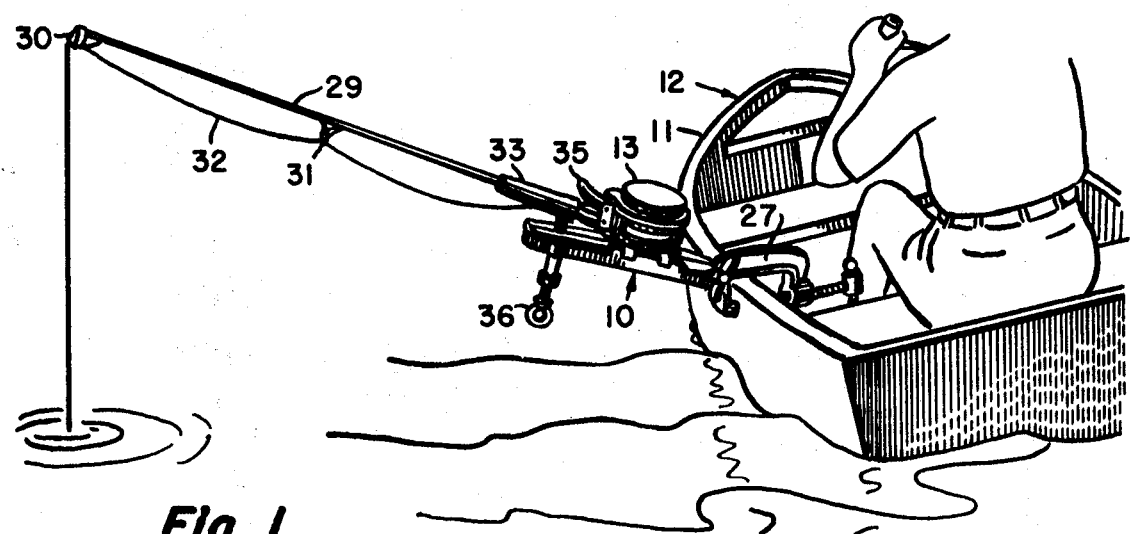
FIG. 1 is a perspective drawing view showing the automatic fishing device attached to the side of a boat.
Figure 2:
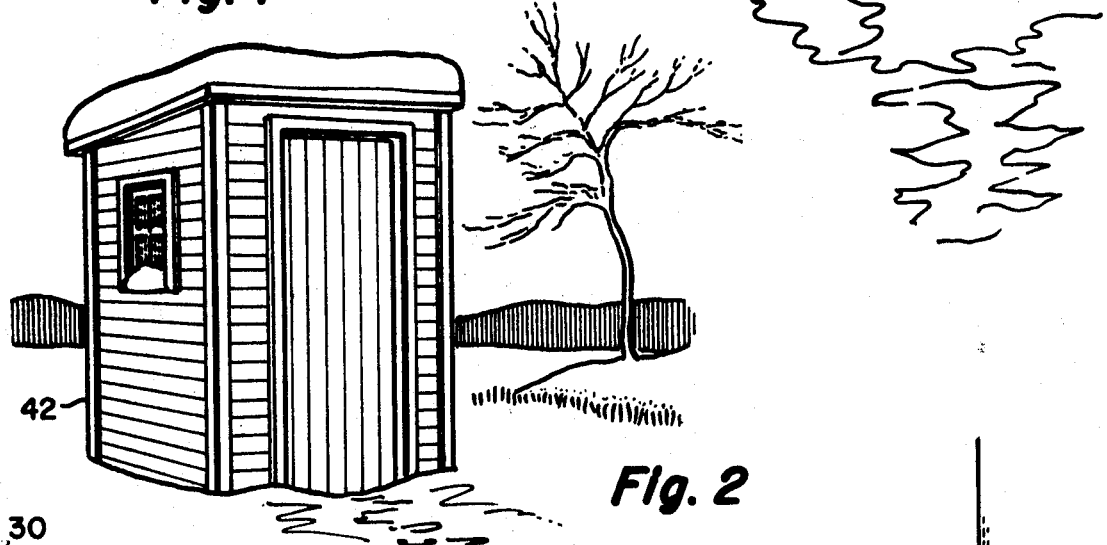
FIG. 2 is a general view of a fish shanty resting on the ice.

Referring to FIG. 1, the automatic fishing device generally indicated at 10 is shown installed on the side 11 of a boat 12. The structure of the automatic device is best shown in FIGS. 4 through 7. The standard automatic reel 13 is mounted on the top flanges 14 and 15 of the arm 16. A pair of clips 17 and 18 are preferably slidably mounted on the flanges 14 and 15, so that they can move along the flanges to and from engagement with the support portions 19 and 20, commonly provided with an automatic reel of the type shown at 13.

Figure 3:
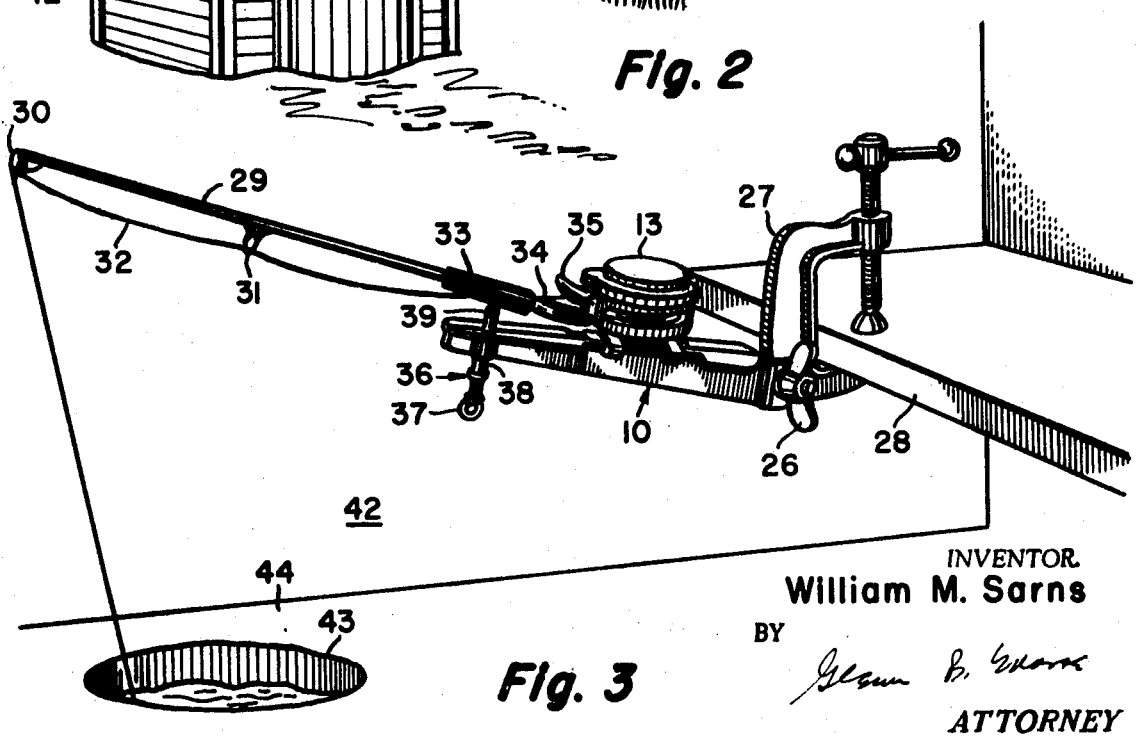
FIG. 3 is a view of the interior of the shanty shown in FIG. 2, showing the installation of the automatic fishing device attached to the seat of the shanty.
Figure 4:
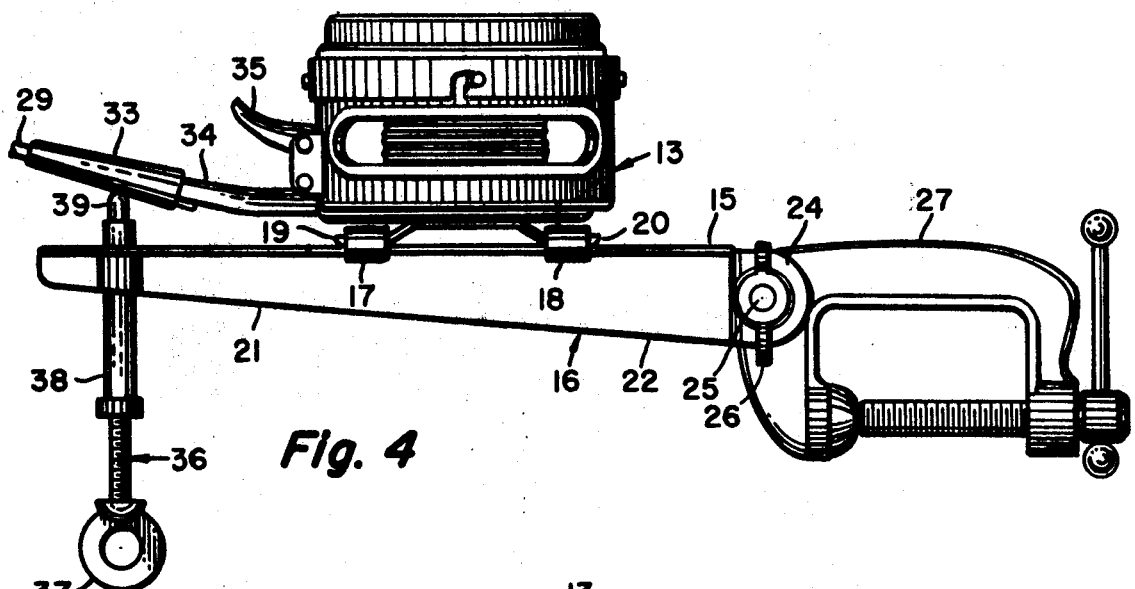
FIG. 4 is a side elevation on an enlarged scale of the complete device.
Figure 5:
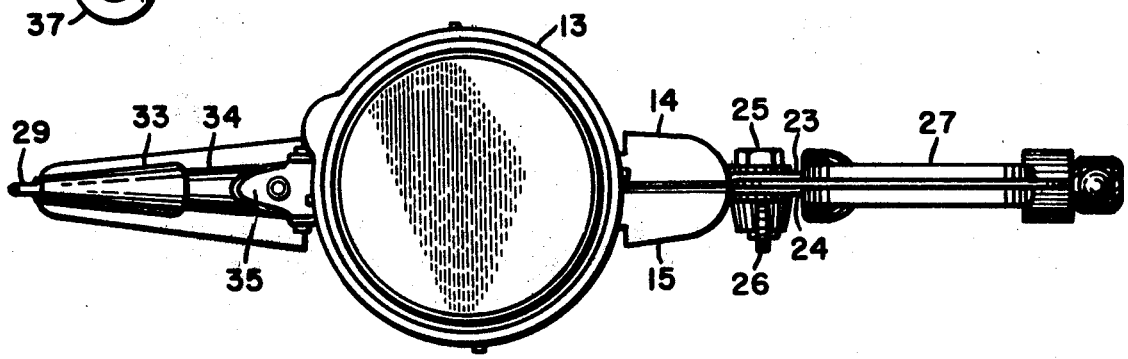
FIG. 5 is a plan view of the unit shown in FIG. 4, FIGS. 4 and 5 being in projection.
Figure 6:
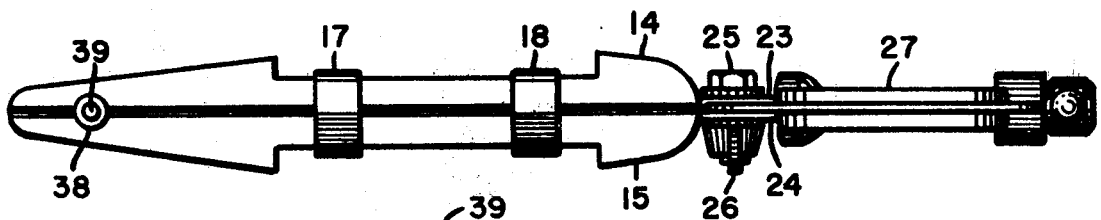
FIG. 6 is a top view of the bracket of the device shown in FIGS. 4 and 5, with the reel removed.
Figure 7:
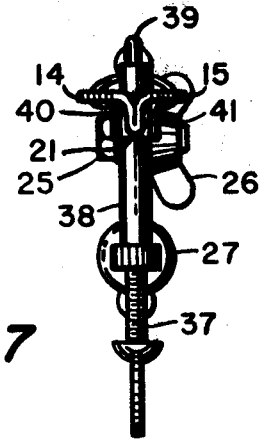
FIG. 7 is an end view with the bracket shown in FIG. 6.

The cross-section of the arm 16 is best shown in FIG. 7. A fold of sheet metal produces the lower edge 21, and a double thickness of material forming the web 22 extends from the edge 21 to the flanges 14 and 15. The double thickness of the web is separated to form the tabs 23 and 24 which receive the bolt 25 secured by the wing nut 26 to form a pivotal connection of the arm 16 to the C clamp 27. This clamp is an otherwise conventional item well-known to machinists and woodworkers. The functioning of the clamp is illustrated in FIGS. 1 and 3. FIG. 1 shows the position of the bracket assembly for installation on the generally vertical side of a boat, and FIG. 3 shows an installation on a horizontal panel forming the seat 28. Loosening and tightening the wing nut 26 permits an articulation of the arm 16 with respect to the clamp 27 to accommodate the difference between horizontal and vertical surfaces, while maintaining approximately the same extended position of the pole section 29 of the device.

The pole section 29 is provided with ferrules 30 and 31 receiving the fish line 32 wound on the automatic reel 13. The pole section 29 also has a socket 33 that slips solidly over the trigger 34. Downward movement of this trigger, as the reel is oriented in FIGS. 1, 3, and 4, removes the restraint on the spring mechanism of the reel so that the line 32 is placed in tension. The amount of this tension can be controlled by the usual adjustments on the reel 13. The control lever 35, incidentally, operates a brake on the reel, and this control is not normally used in conjunction with the present invention.

A self-contained spring within the automatic reel 13 biases the trigger 34 upwardly, and this action can be supplemented by the adjustment device 36. This is a conventional spring plunger unit, in which the screw 37 bears against a compression spring (not shown) contained within the tube 38, to apply upward pressure on a slidable plunger 39 bearing against the underside of the socket 33. Rotative adjustment of the screw 37 will vary the degree of compression of this spring inside the tube 38 to vary the upward pressure on the plunger, and consequently vary the amount of tension on the line 32 which is necessary to pull the pole section 29 downwardly enough to actuate the trigger 34. Preferably, the double thickness of the material forming the web section 22 is separated to form the semicylindrical portions 40 and 41 (refer to FIG. 7) to receive the tubular housing portion of the spring plunger unit in a press fit.

The installation in the ice-fishing shanty 42, as shown in FIG. 3, controls the fish line 32 that has been lowered through the hole 43 in the ice 44 supporting the shanty 42. Experience has shown that this arrangement is far more sensitive and "productive" than the hand of even a skilled and experienced fisherman. The screw 37 can be adjusted such that the lightest tug on the line 32 will instantly apply a quick jerk to set the hook. The fish will be gradually pulled to the surface at the hole 43, where the fisherman can remove him. Continued tension in the line 32 caused by the pulling of the fish will permit the force transmitted by the line 32 to be held relatively constant, due to the presence of the winding spring of the reel 13. In other words, the fish is free to run with the hook, under a continuing light restraint that practically eliminates breaking the line, and yet gradually draws the fish to the surface.

I claim:
1. In combination with a trigger-controlled, spring-biased reel wherein actuation of said trigger is operative to release said reel to the action of said spring to cause reel rotation, an automatic fishing device, comprising:
   a bracket secured with respect to said reel; and
   a pole member mounted on said trigger whereby downward deflection of said pole member with respect to said reel actuates said trigger, said pole member including at least one ferrule carrying line wound on said reel.
2. A combination as defined in claim 1, wherein said pole member has an end socket receiving said trigger.
3. A combination as defined in claim 1, additionally including an adjustable bias member operative between said bracket and said trigger and pole to increase the resistance of said trigger and pole to downward deflection.

References Cited

UNITED STATES PATENTS

| 2,461,356 | 2/1949 | Sus et al. | 43—15UX |
| 2,931,121 | 4/1960 | Torbett | 43—15 |

FOREIGN PATENTS

| 280,117 | 11/1914 | Germany | 43—15 |

SAMUEL KOREN, Primary Examiner

D. J. LEACH, Assistant Examiner